United States Patent Office 3,812,045
Patented May 21, 1974

3,812,045
DISHWASHING COMPOSITION AND METHOD OF MAKING SAME
Frederick William Gray, Summit, N.J., assignor to Colgate-Palmolive Company, New York, N.Y.
No Drawing. Continuation of abandoned application Ser. No. 780,244, Nov. 29, 1968. This application Oct. 7, 1971, Ser. No. 187,525
Int. Cl. C11d 7/56
U.S. Cl. 252—99      5 Claims

ABSTRACT OF THE DISCLOSURE

A dishwashing composition is prepared by first converting an alkali-metal trimetaphosphate to the alkali-metal tripolyphosphate hexahydrate by reaction with sodium hydroxide in the presence of a sulfonated alkyl naphthalene wetting agent and formulating the product with various components to form a dishwashing composition having highly desirable characteristics.

---

This is a continuation of application Ser. No. 780,244 filed Nov. 29, 1968, now abandoned.

Detergent compositions for use in automatic dishwashers must meet a number of criteria such as protection of overglaze decoration of china, non-spotting of glassware, non-tarnishing of silverware, detergency for cleaning the items being washed, absence of foaming, non-caking of composition on the shelf, non-gelling of the composition in the washing machine, retention of available chlorine during shelf life for subsequently sanitizing items in washer and others. All too frequently the solution to one problem results in the reoccurrence of one of the other difficulties.

The principal detergent used in dishwashing compounds is an alkali-metal phosphate, in which the ratio of $Me_2O$ to $P_2O_5$ is from 1 to 3:1, Me being sodium or potassium. It is known that sodium tripolyphosphate, alkali-metal pyrophosphate or ortho-phosphate, and sodium hexametaphosphate have been used. More recently it has been found that sodium tripolyphosphate hexahydrate is useful. However, the presence of excess water of hydration, as frequently occurs when preparing the hexahydrate from the trimetaphosphate or tripolyphosphate seriously affects other desirable characteristics of the composition, such as the chlorine stability, the anti-caking of the composition during shelf-life and the like.

Since suitable sodium tripolyphosphate hexahydrate is not obtainable from commercial sources it has become necessary to prepare the hexahydrate during the formulation of the composition in order to prepare the hexahydrate without the undesirable, excess water of hydration.

According to the present invention a highly suitable tripolyphosphate hexahydrate is prepared, in situ, so to speak, which enables one to formulate a dishwashing composition having the highly desirable characteristics mentioned above.

More specifically, a silicate, such as an alkali-metal silicate, in water, an alkali-metal sulfate and an anionic wetting agent such as sulfonated alkyl naphthalene were combined and mixed until a consistent foam was obtained. At this point an alkali metal trimetaphosphate was added and the temperature raised to about 140° F. A 50% sodium hydroxide solution was then added. The temperature of the reaction mass rose to about 220° F. with substantial fluffing or frothing. During this reaction period a substantial amount of water vapor was evolved. After a short time the reaction subsided and the crumbly material which was nearly dry to the touch was further dried by heating at 140° F. to a constant weight. The product containing the alkali-metal tripolyphosphate hexahydrate had a water content of 21.6% (Ohaus Moisture Analysis).

To this hexahydrate material was added about 11% of a bleach mixture containing an alkali metal dichloroisocyanurate, an alkali metal sulfate and a portion of the hexahydrate to provide about 1% available chlorine content in the final composition. This method of adding the chlorine compound ensures thorough distribution in the composition.

The product prepared as mentioned above had excellent bleach stability since no loss of available chlorine occurred after 120 hours at 140° F. in a sealed jar; it did not have an offensive odor and it remained free-flowing and did not cake up. It afforded excellent cleaning and detergent properties while offering complete safety against damage to overglaze decoration of china.

In the above mentioned process it is usually desirable to use sodium silicate having a ratio of $SiO_2/Na_2O$ of from 1:2 to 1:3.2, sodium sulfate, and sodium trimetaphosphate as the initial ingredients. The anionic wetting agent is a sulfonated alkyl naphthalene product, preferably the product known as "Petro-11," which is the sulfonated methyl naphthalene material made and sold by Petrochemicals Company. The alkali-metal dichloroisocyanurate is preferably the potassium salt but may also be the sodium salt, if desired.

The use of the wetting agent during the conversion of the trimetaphosphate to the tripolyphosphate hexahydrate appears to result in a product which does not include excess moisture, which as noted above, impairs stability and the non-caking characteristics desired. Possibly, the "fluffing" or frothing of the reaction materials during the conversion reaction at high temperatures enables the excess free water to be evolved from the reaction mixture so that only combined water of hydration remains therein.

The invention will now be described with reference to the following example:

|  | Gm. |
|---|---|
| Sodium silicate solution (43% solids) ($SiO_2/Na_2O$ ratio 1:2.35) | 368 |
| Water | 160 |
| Sodium sulfate | 12 |
| Methyl naphthalene sulfonate (Petro-11) | 16 |

These materials were thoroughly mixed to produce a consistent foam.

368 grams of sodium trimetaphosphate were added to the reaction mixture and the temperature was raised to about 140° F. in about 3 minutes.

192 grams of sodium hydroxide (50% solution) at about 140° F. were then added. In about 1 minute the temperature had risen to about 220° F. There was marked "fluffing" or frothing with strong evolution of water vapor during the reaction which was completed in about 3 minutes. The reaction mass was "crumbly" and nearly dry to the touch. It was then dried to a constant weight at about 140° F. The reaction mass contained 21.6% water by the Ohaus Moisture Analysis Test.

Next a bleach mixture containing about 20% by weight of potassium dichloroisocyanurate, 30% sodium tripolyphosphate and 50% sodium sulfate was prepared by mixing the dry ingredients. 8 parts by weight of the bleach mixture was added to 92 parts by weight of the previously prepared tripolyphosphate hexahydrate reaction mixture. This provides about 1% available chlorine in the final composition.

Subsequent tests showed that the chlorine stability was excellent and that the other criteria concerning spotting of glassware, tarnishing of silverware, protection of overglaze decoration of china, cleaning, sanitizing, caking during shelf-life, gelling during use, and foaming were all excellent.

It will be understood, as is customary in this field that small amounts of a suitable perfume and, if desired, a compatible dyestuff may be added for identification purposes or for improved saleability.

Although reference has been made above and in the appended claims to specific compounds it will be understood to those familiar with this art that equivalents are to be included by the terminology used.

It will be apparent that changes and modifications of the various features described herein may be made without departing from the spirit and scope of the invention. It is therefore apparent that the foregoing description is by way of illustration of the invention rather than limitation thereof.

What is claimed is:

1. In a process for producing a dishwashing composition comprising the step of reacting sodium or potassium trimetaphosphate with an aqueous sodium hydroxide solution to form the sodium or potassium tripolyphosphate hexahydrate in a substantial dry form containing substantially no excess moisture, the improvement which comprises carrying out the reaction in the presence of a sulfonated methyl naphthalene wetting agent and sodium silicate having a ratio of silica to sodium oxide of from 1:2 to 1:3.2, and subsequent to the reaction mixing said tripolyphosphate hexahydrate reaction mixture with potassium or sodium dichloroisocyanurate.

2. A method as claimed in claim 1 wherein the alkali-metal trimetaphosphate is sodium trimetaphosphate.

3. A method as claimed in claim 1 wherein the dichloroisocyanurate is potassium dichloroisocyanurate.

4. A method as claimed in claim 1 wherein the silicate, water and wetting agent are pre-mixed to produce a foam and then adding the trimetaphosphate and further comprising the step of heating the mixture to about 140° F. prior to the addition of the sodium hydroxide solution.

5. A method as claimed in claim 1 including the further step of drying the reaction product at about 140° F. to a constant weight prior to the mixture with the dichloroisocyanurate.

References Cited
UNITED STATES PATENTS

| | | | |
|---|---|---|---|
| 3,390,093 | 6/1968 | Feierstein et al. | 252—135 X |
| 3,248,330 | 4/1966 | Feierstein et al. | 252—99 |
| 3,454,499 | 7/1969 | Meyer et al. | 252—539 |

MAYER WEINBLATT, Primary Examiner

U.S. Cl. X.R.

252—135, 539; 423—312, 314, 315